(12) United States Patent
Fadini et al.

(10) Patent No.: US 6,409,228 B1
(45) Date of Patent: Jun. 25, 2002

(54) SPRING SYSTEM FOR CONNECTING TWO FLANGES

(75) Inventors: Rolf Fadini, Leutenbach; Helmut Hutt; August Kästner, both of Welzheim, all of (DE)

(73) Assignees: Christian Bauer GmbH & Co. KG, Welzheim; DaimlerChrysler AG, Stuttgart, both of (DE)

( * ) Notice: Subject to any disclaimer, the term of this patent is extended or adjusted under 35 U.S.C. 154(b) by 0 days.

(21) Appl. No.: 09/462,212

(22) PCT Filed: Jul. 4, 1998

(86) PCT No.: PCT/DE98/01927

§ 371 (c)(1),
(2), (4) Date: Jan. 4, 2000

(87) PCT Pub. No.: WO99/02912

PCT Pub. Date: Jan. 21, 1999

(30) Foreign Application Priority Data

Jul. 7, 1997 (DE) .......................... 197 28 973

(51) Int. Cl.[7] ................................. F16L 37/00
(52) U.S. Cl. ................................. 285/305; 285/114
(58) Field of Search ................... 285/305, 261, 285/47, 114

(56) References Cited

U.S. PATENT DOCUMENTS

| 2,240,078 | A | * | 4/1941 | Rader | 285/261 X |
| 2,397,438 | A | * | 3/1946 | Schmid | 285/261 X |
| 2,864,378 | A | * | 12/1958 | Schneller et al. | 285/261 X |
| 3,881,753 | A | | 5/1975 | Bochory | |
| 4,230,109 | A | * | 10/1980 | Geiss | 285/114 X |
| 4,352,586 | A | * | 10/1982 | Hayden | 285/305 X |
| 4,913,468 | A | * | 4/1990 | Rattmann | 285/114 X |
| 5,248,306 | A | * | 9/1993 | Clark et al. | 285/114 X |
| 5,350,201 | A | | 9/1994 | Bynum | |
| 5,904,221 | A | * | 5/1999 | Breitwig et al. | 285/305 X |
| 5,957,894 | A | * | 9/1999 | Kerwin et al. | 285/114 X |

FOREIGN PATENT DOCUMENTS

| DE | 11 87 437 | 2/1965 |
| DE | 19 45 025 | 8/1966 |
| DE | 26 27 375 | 12/1977 |
| DE | 41 01 849 | 7/1992 |
| DE | 44 44 540 | 6/1996 |
| FR | 2 315 605 | 1/1977 |

* cited by examiner

Primary Examiner—Lynne H. Browne
Assistant Examiner—David E. Bochna
(74) Attorney, Agent, or Firm—Collard & Roe, P.C.

(57) ABSTRACT

A spring system for connecting two flanges (13, 14), for use especially in a motor vehicle exhaust system. The spring system is configured as an elastic, flexible clamp with functionally first (1, 2) and second (4, 5) U-shaped clamping jaws positioned opposite each other. This provides a spring system which is easy to assemble and economical to produce. To this end the spring system has the U-shaped arms (6, 7) of the clamping jaws (1, 2; 4, 5) having only locally very restricted areas (8, 9, 10) for direct application to the pieces (11, 13; 12, 14) to be joined by means of the clamp. Four application areas (8) exercising both clamping functions are present in at least one of the clamping planes (100 or 200), of which two areas are arranged in pairs and situate diametrically opposite each other.

4 Claims, 1 Drawing Sheet

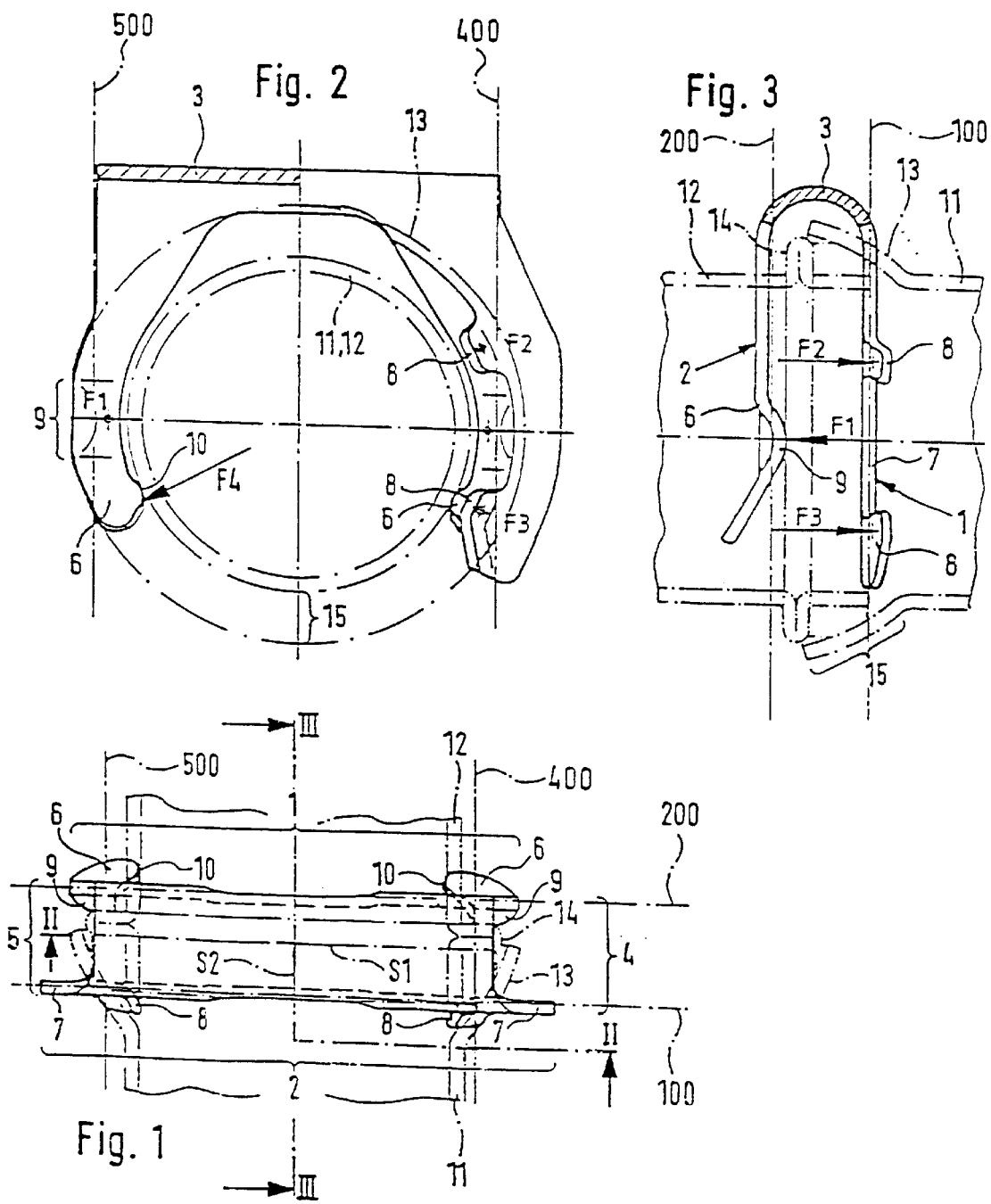

SPRING SYSTEM FOR CONNECTING TWO FLANGES

BACKGROUND OF THE INVENTION

1. Field of the Invention

The invention relates to a spring device for connecting two flanges in accordance with the preamble of Patent Claim 1.

2. The Prior Art

Spring devices of this type, which are disclosed in DE 41 01 849 A1 and DE-B-1 187 437, are unsuitable for high connection forces. At the same time, the device according to DE 41 01 849 A1 also does not provide a secure hold on the flanges without additional locking means. The device according to DE-B-1 187 437 is comparable, with regard to its structure and action, to a clothes peg operating with a tension spring. The structure thereof is complicated and the clamping forces which can be applied with the tension spring are extremely limited unless an outlay which is no longer economically viable for such parts is made.

DE 44 44 550 A1 discloses a spring device in which the flanges which are to be connected to one another are connected frictionally and in a form-fitting manner to one another between two cup springs which are braced towards each other. At least the end surface on one of the two flanges which are connected to each other and against which one of the two cup springs bears, is of spherical design around its periphery. Moreover, the said flanges can be connected to each other in the manner of a ball-and-socket joint. The flanges are situated in each case at the ends of conduits which are to be connected to one another via the flanges. The said cup-spring connecting device is complicated to fit. Moreover, in conduits which are connected to one another via flanges, the cup springs cannot be removed for replacement from the ends of the conduit in a non-destructive manner if the conduits are fixedly installed, for example in the exhaust system of a motor vehicle. However, the sphere of application corresponds to the that sphere to which the invention refers in terms of generic type. In particular, the connection forces and the angle offset which is possible in that known device and under which the conduits and therefore their flanges can be connected to one another, together with the demands made of a connection according to the invention, are of comparable type and size.

SUMMARY OF THE INVENTION

The invention is concerned with the problem of providing a spring device which can be fitted and replaced easily and can be produced cost-effectively and which ensures a secure hold in particular without additional aids.

This problem is solved by a spring device of the generic type having the characterizing features of Patent Claim 5.

A spring device of this type can be pushed on in a simple manner laterally and radially at the end sides of the flanges to be connected to one another, and can therefore also be readily replaced at any time by simply pulling off.

This makes available a spring clip which in the fitted state acts or can act in a clamping manner in different directions. In this arrangement, the clamping action in one direction causes the flanges gripped in the clamp to be pressed against one another, and the clamping action in the other direction causes the conduits, which are preferably cylindrical pipes and which are adjacent to the flanges to be connected and are connected to them, to be unclamped. The spring actions directed in two different directions can differ in size as desired.

The limbs of the clamping jaws have regions which are only locally tightly restricted and in which they bear against the flanges and against the conduits connected to the said flanges. Small contact surfaces of this type permit a secure hold and in the case of hot flanges or conduits connected to the said flanges protect the spring device from a high flow of heat into the spring device. The locally restricted bearing regions have virtually the function of a heat throttle. A slight flow of heat into the spring element prevents excessive heating of the spring element at high temperatures of the parts to be connected by the spring element. Low temperatures at the spring device are important, since with the same spring material the spring force decreases with rising temperatures.

A spring device with the limbs of its clamping jaws acting in a clamping manner in two different directions is a virtual necessity in this form if the clamping-jaw limbs rest in a locally restricted manner on a spherical bearing surface of the flanges, which surface is formed by an annular strip from a spherical surface. In this arrangement, the individual bearing regions of the limbs of a clamping jaw bear on the same peripheral annular strip. If, in the tension state of the spring device, i.e. in a state in which it is pulled up onto the flanges to be connected, the distance between the limbs of the functionally first clamping jaws is changed by a pivoting movement between the two first clamping jaws, then by means of the double clamping action of the spring device on account of the individual limbs bearing on a spherical annular segment, the distance between the U-limbs of the functionally second clamping jaws also changes.

For a statically satisfactory alignment of the spring device on the supports of flanges which are to be connected to one another, in particular of such flanges in which at least one flange support surface is of spherical design, it can be expedient that a different number of bearing regions is provided on in each case one of the functionally first and/or second clamping jaws.

The bearing regions in the clamping jaws are in each case positioned in such a manner that in the push-on direction of the spring device a type of snapping onto the circumference of those parts which are to be connected to one another via the flanges and which are in particular pipes, can take place. This radial snapping-on provides a means of securing against slipping.

BRIEF DESCRIPTION OF THE DRAWING

An exemplary embodiment which is described in further detail in the following is illustrated in the drawing, in which:

FIG. 1 shows a view of the back region of a clamping-jaw spring device with a flange, indicated by dash-dotted lines, at the end of a pipe, FIG. 2 shows a section through the spring device along the line II—II in FIG. 1, FIG. 3 shows a section through the spring device along the line III—III in FIG. 1.

DETAILED DESCRIPTION OF PREFERRED EMBODIMETS

A spring device made of spring steel consists of a functionally first clamp having functionally first clamping jaws 1 in a clamping plane 100 and clamping jaws 2 in a clamping plane 200, which clamping jaws can be pivoted with respect to each other about a first pivot axis S1 in a spring back regions with elastic deformation of the material. The two clamping planes 100 and 200 are approximately parallel.

A functionally second clamp is formed by a pair of functionally second clamping jaws 4 in a clamping plane 400 and clamping jaws 5 in a clamping plane 500, which clamping jaws can be pivoted about a pivot axis S2 with elastic deformation of the material. The two clamping planes 400 and 500 are likewise approximately parallel.

The two functionally first clamping jaws 1 and 2 have U-limbs 6 and 7 which are in each case adjacent to their pivot axis S1. These U-limbs at the same time form the functionally second clamping jaws 4, 5, in which case then the U-limbs 6 and 7 in each case meet in the pivot axis S2.

Two bearing webs 8 are in each case integrally formed on the U-limbs 7. The bearing webs 8 are at such a distance with respect to each other on a respectively assigned U-limb 7 that the two opposite U-limbs 7 can be snapped radially onto a cylindrical body in order to give a stable position. Beads 9 are formed as local bearing regions on the U-limb 6 of the opposite, functionally first clamping jaw 1.

In the case of the U-limbs 6 of the functionally second clamping jaws 4, 5, per clamping jaw in each case there is integrally formed a locally restricted, potential bearing region 10 which may also be omitted.

With the spring device described, two pipes 11, 12 can be connected fixedly to each other via their respective flanges 13, 14. The spring device is configured in such a manner that in particular the functionally first clamping jaws 1, 2 are highly pretensioned as the spring device is being pulled onto the flanges 13, 14 to be connected to each other. As a result, the flanges 13, 14 are pressed together by the springing-back clamping jaws with a force which is sufficient to give a firm connection.

At least the flange 13 is of spherical design, in the form of a peripheral annular strip 15, on its end bearing surface for supporting the relevant U-limbs 7.

The bearing webs 8 bear against the spherically shaped annular strip 15 and ensure both the transmission of the axial connecting force and also the radial fixing of the spring device. For the radial fixing of the spring device, it is already sufficient for a single U-limb, namely the U-limb 7, to bear against bearing regions 8 mounted in such a way.

Forces act on the contact points of the bearing webs 8 and of the beads 9. The forces which act in the case of the connection of the flanges 13, 14 are indicated in FIGS. 2 and 3 by their axial components F1, F2 and F3.

The U-limbs 6 of the spring device can be designed in such a manner that in the fitted state the potential bearing regions 10 make contact with the circumference of the associated pipe 12 with the force F4. Contact in such a way is not required in the present exemplary embodiment.

What is claimed is:

1. Spring device in combination with two flanges for connecting the two flanges to ends of pipes to be connected to one another, in particular of two pipes of a motor-vehicle exhaust system, having the following features:

the spring device is as an elastically flexible clamp having U-shaped, functionally first and second clamping jaws (1, 2) and (4, 5), respectively, situated opposite each other, U-limbs (6, 7) of the functionally first clamping jaws (1 and 2, respectively) lie in two essentially parallel clamping planes (100, 200) of the clamping jaw (1 and 2, respectively), said U-limbs (6, 7) of the functionally second clamping jaws (4 and 5, respectively) lie in two essentially parallel clamping planes (400, 500) of the second clamping jaws (4 and 5, respectively), the spring device is in one piece with a spring back region (3) and consists exclusively of the elastically flexible clamp, the first and second clamping jaws (1, 2 and 4, 5, respectively) have respective pivot axes (S1 and S2, respectively) which intersect each other in the spring back region (3) at right angles in a common plane, by being pivoted about the pivot axis S1 of the functionally first clamping jaws (1, 2) and also at least by being pivoted about the pivot axis S2 of one of the functionally second clamping jaws (4, 5), the clamp is fixed on the mutually remote end surfaces of the flanges (13, 14) with a clamping force that includes an axial force desired for the flange connection, said U-limbs (6, 7) of the clamping jaws (1, 2; 4, 5) for the first and second function of these clamping jaws (1, 2; 4, 5) have, in the respective clamping planes (100, 200, 400 and 500), regions (8, 9, 10), which are only locally tightly restricted, for a direct bearing against the parts (11, 13; 12, 14) which are to be connected to one another by the clamp, there being in at least one of the clamping planes (100 or 200) four bearing regions (8) which exert two clamping functions and of which in each case two are arranged in pairs diametrically opposite each other.

2. Spring device combination according to claim 1, wherein when there is a different number of bearing regions (8, 10) in the two clamping planes (100 and 200), the said bearing regions (8, 10) are offset circumferentially with respect to one another.

3. Spring device combination according to claim 1, wherein there are four bearing regions (8), of which two lie in pairs diametrically opposite each other in a first of the clamping planes (100 or 200) and two bearing regions (10) in the second of these clamping planes (100 or 200), the two bearing regions (10) lying in the one clamping plane lie within the region of a pair of bearing regions (8) of the other clamping plane.

4. Spring device combination according to claim 1, for connecting two flanges (13, 14), wherein at least one has a spherical support surface for that part of the spring device which comes to bear there.

* * * * *